United States Patent [19]

Arao et al.

[11] 3,916,776

[45] Nov. 4, 1975

[54] JUICER

[75] Inventors: Yuzuru Arao, Takatsuki; Terukazu Yamauchi, Toyonaka, both of Japan

[73] Assignee: Matsushita Electric Industrial Co., Ltd., Osaka, Japan

[22] Filed: July 26, 1973

[21] Appl. No.: 382,749

[30] Foreign Application Priority Data
July 31, 1972 Japan.............................. 47-77216
Aug. 1, 1972 Japan.............................. 47-77499

[52] U.S. Cl.................... 99/503; 64/30 R; 259/108
[51] Int. Cl.²...................... A23N 1/00; A47J 43/14
[58] Field of Search...... 99/495, 503, 513; 269/107, 269/108, DIG. 35; 74/221, 242.5; 192/65; 64/30 R

[56] References Cited
UNITED STATES PATENTS

| | | | |
|---|---|---|---|
| 1,406,933 | 2/1922 | Cohn | 74/221 |
| 1,507,880 | 9/1924 | Zouvelos | 99/503 |
| 1,913,157 | 6/1933 | Greist et al. | 259/DIG. 35 |
| 2,315,018 | 3/1943 | Lawrence | 99/513 X |
| 2,427,099 | 9/1947 | Kennedy | 259/DIG. 35 |
| 2,440,425 | 4/1948 | Williams | 99/513 X |
| 2,801,545 | 8/1957 | Schottle | 259/DIG. 35 |

FOREIGN PATENTS OR APPLICATIONS
131,057 4/1929 Switzerland........................... 99/513

*Primary Examiner*—John W. Huckert
*Assistant Examiner*—Charles Gorenstein
*Attorney, Agent, or Firm*—Burgess, Ryan and Wayne

[57] ABSTRACT

A juicer is provided with a casing having a motor for rotating a separation perforated basket mounted therein and a juice receiver adapted to be removably placed into a stand formed in the casing. A mixing device is disposed within the juice receiver and is selectively coupled to the motor through a rotation transmission means which in turn is selectively drivingly coupled to the motor. Furthermore, means are provided to minimize the vibrations and noise of the motor. Between the mixing device and the rotation transmission means is interposed a friction clutch means which permits the easy insertion and removal of the juice receiver into and out of the stand in the casing.

13 Claims, 17 Drawing Figures

JUICER

BACKGROUND OF THE INVENTION

The present invention relates to a juicer of the type having a juice receiver which is adapted to be detachably attached to the juicer and is provided with a juice mixing means.

In general, juice extracted by a juicer is first recieved into a juicer receiver from which the juice is dispensed into glasses or the like. When there is added to the juice ice, sugar, honey and so on, the juice is mixed within a glass by means of a spoon or the like. The above operations are very cumbersome, and when juice is left for a relatively long time, the juice ingredients are separated into layers so that the juice must be mixed again before it is served.

SUMMARY OF THE INVENTION

In view of the above, one of the objects of the present invention is to provide a juicer of the type in which, when a juice receiver is placed upon the casing of the juicer, juice in the juice receiver is mixed.

Another object of the present invention is to provide a juicer in which a juicer receiver is provided with juice mixing means which in turn is selectively drivingly coupled to a motor within the casing, whereby juice in the juice receiver may be mixed in a very simple manner.

Another object of the present invention is to provide a juicer which consists of the minimum number of component parts, is simple in construction and inexpensive to manufacture because the juice mixing means in the juice receiver is adapted to be driven by the motor of the juicer.

Another object of the present invention is to provide a juicer of the type described above and further comprising means operable external to the juicer for selectively coupling the motor to the juice mixing means.

Another object of the present invention is to provide a juicer of the type described above and in which means for selectively drivingly coupling the motor to the juicer mixing means is so disposed as to reduce the vibrations and noise produced when juice is extracted.

Another object of the present invention is to provide a juicer of the type described above and further comprising clutch means adapted to permit the very simple coupling between the juice mixing means and the rotation transmission means.

Another object of the present invention is to provide a juicer of the type described above and in which the clutch means interposed between the juice mixing means and the rotation transmission means may be retracted to a position inaccessible by a hand when the clutch means is disengaged.

The above and other objects, features and advantages of the present invention will become more apparent from the description of two preferred embodiments thereof taken in conjunction with the accompanying drawings.

DESCRIPTION OF THE PREFERRED EMBODIMENTS

First Embodiment, FIGS. 1–9

Figure 1:
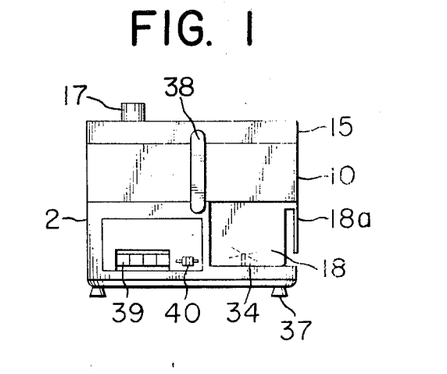
FIG. 1 is a front view of a first embodiment of a juicer in accordance with the present invention.
Figure 2:
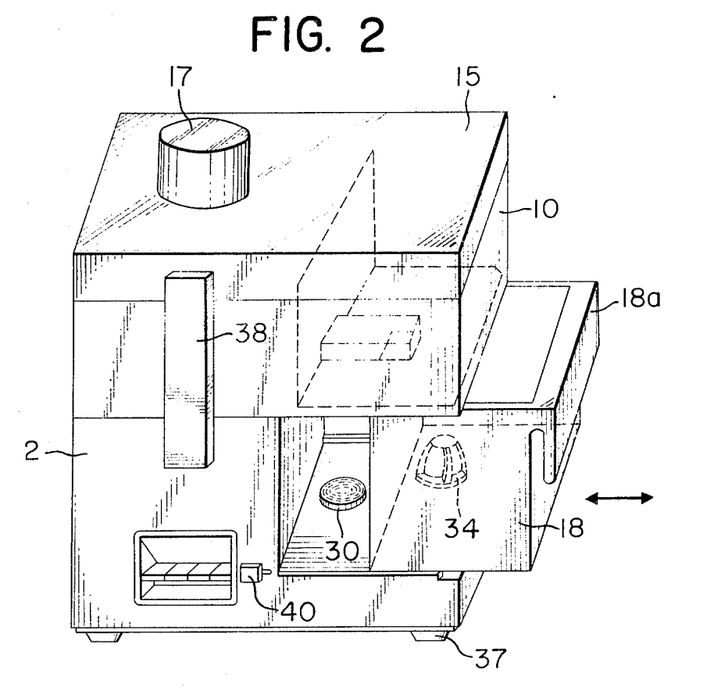
FIG. 2 is a perspective view thereof.
Figure 3:
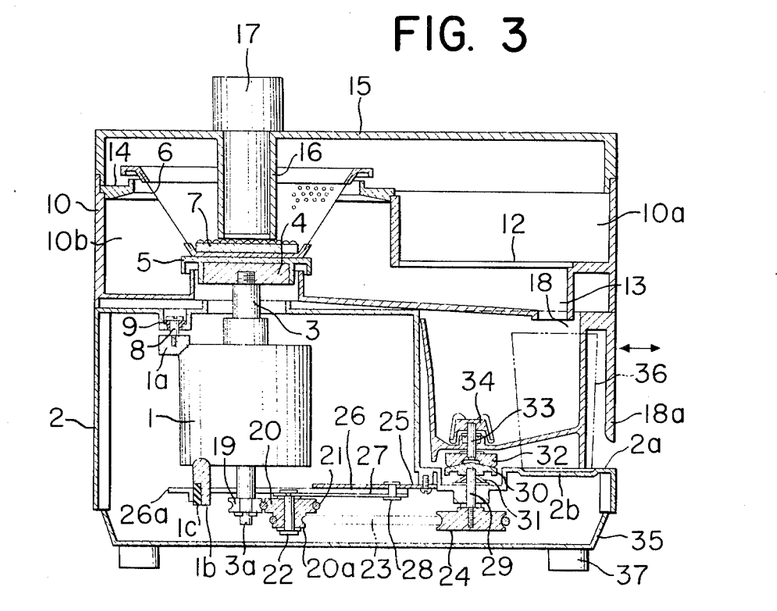
FIG. 3 is a sectional view thereof.
Figure 4:
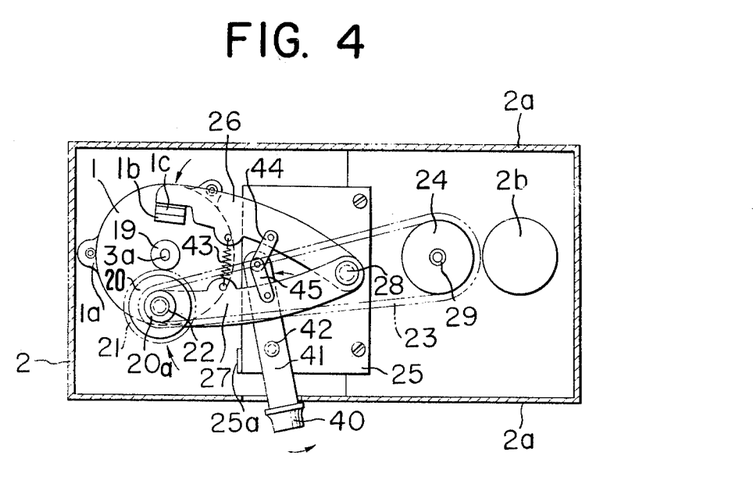
FIGS. 4 and 5 are views used for the explanation of rotation transmission means, motor supporting means and operating means of the first embodiment, respectively.
Figure 5:
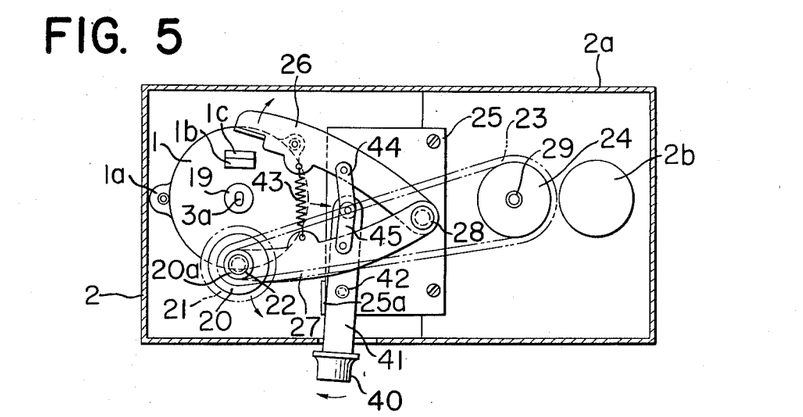

Referring to FIGS. 1–9, a boss 1a of a motor 1 is fixed to a casing or housing 2 with a screw 8 and a yielding rubber 9 in such a manner that the motor 1 may be movable in any direction in order to prevent the vibrations thereof from being transmitted to the housing 2. A rotary shaft 3 of the motor 1 is screwed into a rotary table 4 upon which is fitted a basket support 5 upon which is mounted an inverted-frustoconical shaped separation basket 6. The separation basket 6 is therefore rotated by the motor 1. A container 10 which is mounted upon the casing 2 has an upper opening into which is positioned a charging port or tube 16 formed integral with a cover 15. A partition member 14 disposed around the separation basket divides a space defined by the container 10 and the cover 15 into a juice reservoir 10b and a solid waste reservoir 10a, which are also separated by a cover 12 removably attached to the juice container 10 and provided with a juice discharge port 13 formed integral therewith. Reference numeral 17 denotes a push rod; and 18, a juice receiver which is disposed below the juice discharge port 13 and is provided with a mixing device to be described hereinafter and a handle 18a. The mixing device generally comprises a mixing blade 34 disposed within the juice receiver 18, a shaft 33 which is coupled to the mixing blade 34 and is extended through the bottom of the juice receiver 18 watertightly and a friction coupling disk 32 fixed to the lower end of the shaft 33. A cone shaped mating friction coupling member 30 is adapted to engage with the friction coupling member 32 under the force of a spring 31. The juice receiver 18 may be placed into and removed out of the casing 2 in the direction indicated by the double-pointed arrow as best shown in FIG. 2. When the juice receiver 18 is placed into the casing 2, the driving force is transmitted to the blade 34 of the mixing device through the friction coupling members 30 and 32 by a driving mechanism to be described hereinafter. The reason why the lower friction coupling member 30 has a cone-shaped friction surface is to facilitate not only the engagement with the mating friction coupling member 32 but also the alignment between the mating friction coupling members 30 and 32. The lower friction coupling member 30 is securely fixed to the upper end of a rotary shaft 29 which rotatably extends through a stand 2a formed integral with the casing 2 and has its lower and fixed to a driven pulley 24 which in turn is drivingly coupled through an endless belt 23 to a pulley 20a. A lower driving shaft 3a of the motor 1 is fixed to a driving pulley 19 and is adpated to rotate in unison with the upper rotary shaft 3 when a switch 39 is closed. An intermediate pulley 20 around which is wrapped a rubber ring 21 is brought into engagement with the driving pulley 19 under the force of a coiled spring 43. The intermediate pulley 20 is formed integral with the pulley 20a and is rotatably carried by a shaft 22 which in turn is fixed to a movable arm 27. When it is desired to drive the mixing device of the juice receiver 18, the rubber ring 21 of the intermediate pulley 20 is brought into frictional contact with the driving pulley 19 as shown in FIG. 3. To stop the driving of the mixing device, the rubber ring 21 is moved out of the driving pulley 19. The above engagement or disengagement of the rubber ring 21 with or from the pulley 19 is effected by a lever 41 and a knob 40 operatively coupled to the movable arm 27. The motor 1 is suspended from the casing 2 through the yielding rubber 9 so as to absorb the vibrations and noise, and when the pulley 20 is pressed against the driving pulley 19, the motor 1 would be inclined so that the rotary members that is the separation basket 6 and the cutter 7 would make contact with the charging port 16 or the partition member 14. Therefore, a support 1b with a yielding rubber 1c is formed integral with the motor 1 at a position remote from the intermediate pulley 20 as shown in FIG. 3 so that when the intermediate pulley 20 is brought into engagement with the driving pulley 19, the free end of the movable arm 26 is pressed against the support 1b. As a result, the motor 1 may be balanced to prevent it from being inclined. This balance mechanism is shown in detail in FIGS. 3, 4 and 5. The balance mechanism generally comprises two movable arms 26 and 27 pivoted with a pivot pin 28 to a mount 25 which in turn is fixed to the casing 2, two movable members 44 and 45 whose one ends are pivoted to the midpoints of the movable arms 26 and 27 and whose other ends are pivoted to each other, and the operating lever 41 whose one end is pivoted to the pivot pin 28 with which the other ends of the movable members 44 and 45 are pivoted to each other so that the movable arm 26 and 27 may be operated. The operating lever 41 has its midpoint pivoted to the mount 25 and the knob 40 fixed to the other end thereof. Reference numeral 43 denotes a coiled spring whose ends are fixed to the midpoints of the movable arms 26 and 27 so that the latter may be normally biased to move toward each other; and 25a, a stopper formed integral with the mount 25 so that the movable arms 44 and 45 which are operated by the operating lever 41 are stopped after their pivot is moved in the direction indicated by the arrow (to the right in FIG. 4) after the movable members 44 and 45 have been once aligned with respect to each other.

Figure 6:
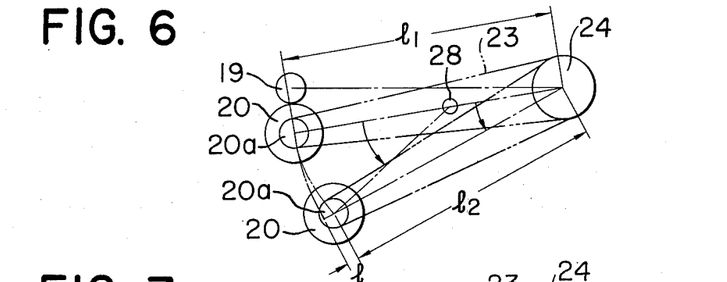
FIGS. 6–9 are views used for the explanation of the mode of operation of rotation transmission means and motor supporting means of the first embodiment, respectively.

FIGS. 6, 7, 8 and 9 are views used for the explanation of the centers of rotation of the driven pulley 24, the intermediate pulley 20, the driving pulley 19 and the movable arm 27 with respect to the pivot pin 28. In the instant embodiment, the pivot pin 28 is located at a position on the line interconnecting the centers of the intermediate pulley 20 and the driven pulley 24 or at a position deviating from this line in the direction remote from the driving pulley 19, because of the following two reasons. First of all, when the intermediate pulley 20 is moved away from the driving pulley 19 as shown in FIG. 6 (the pivot pin 28 being on the line interconnecting the centers of the pulleys 20 and 24), the position of the intermediate pulley 20 is closer to the driven pulley 24 as compared with the case when the intermediate pulley is rotated about the center of the pulley 24 because the center of rotation of the intermediate pulley is between the pulleys 20 and 24. If the distance between the centers of the pulleys 20 and 24 is $l_1$ when the intermediate pulley 20 is brought into engagement with the driving pulley 19 and is $l_2$ when the pulley 20 is out of engagement with the pulley 19, then $l_1 > l_2$. If the belt 23 which is wrapped around the pulley 20a is made integral with the intermediate pulley 20 and the driven pulley 24 is imparted with the optimum tension when the intermediate pulley 20 is brought into engagement with the driving pulley 19, the endless belt 23 may be slacked when the intermediate pulley 20 is moved away from the driving pulley 19, that is, when no rotation transmission is effected from the pulley 20a to the driven pulley 24. Therefore, the adverse effects upon the aging and service life of the endless belt 23 may be minimized.

Figure 7:
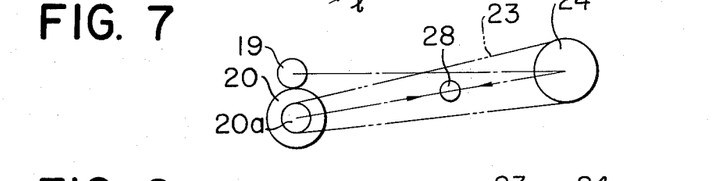
Figure 8:
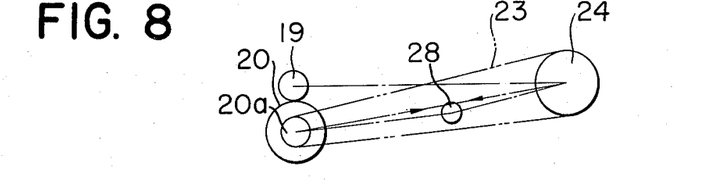
Figure 9:
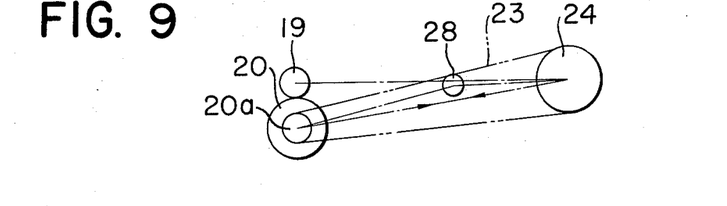
Figure 10:
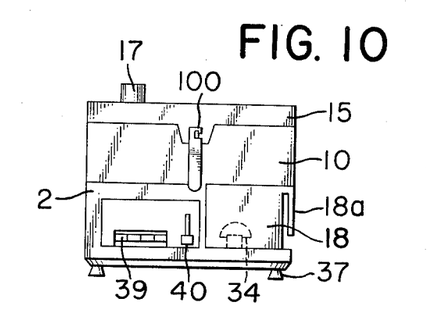
FIG. 10 is a front view of a second embodiment of a juicer in accordance with the present invention.
Figure 11:
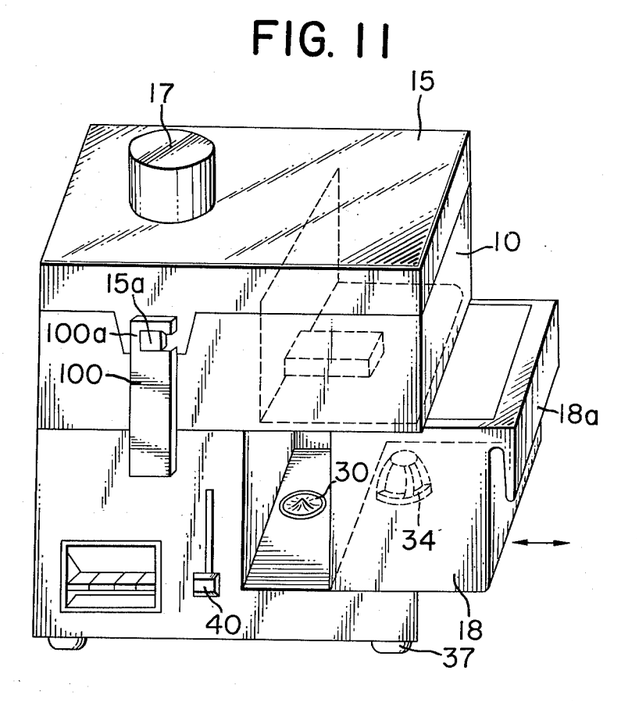
FIG. 11 is a perspective view thereof.
Figure 12:
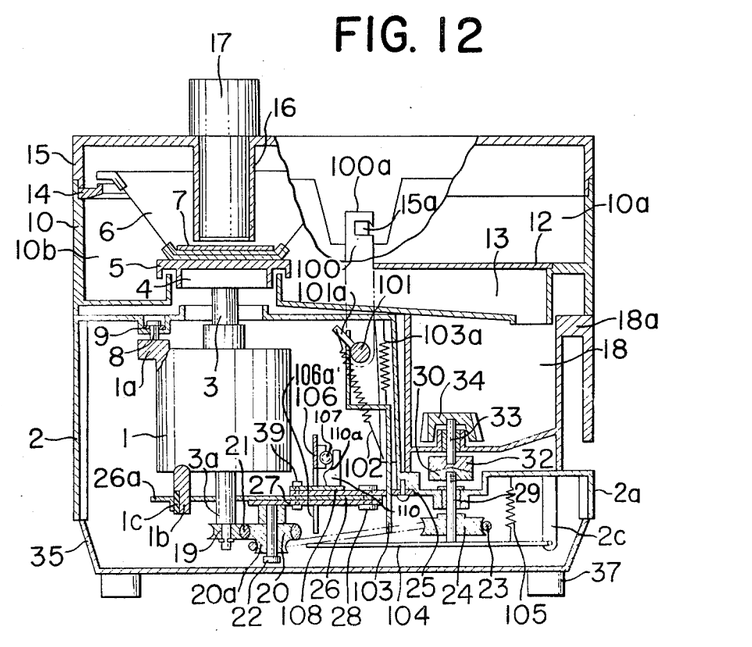
FIG. 12 is a sectional view thereof.
Figure 13:
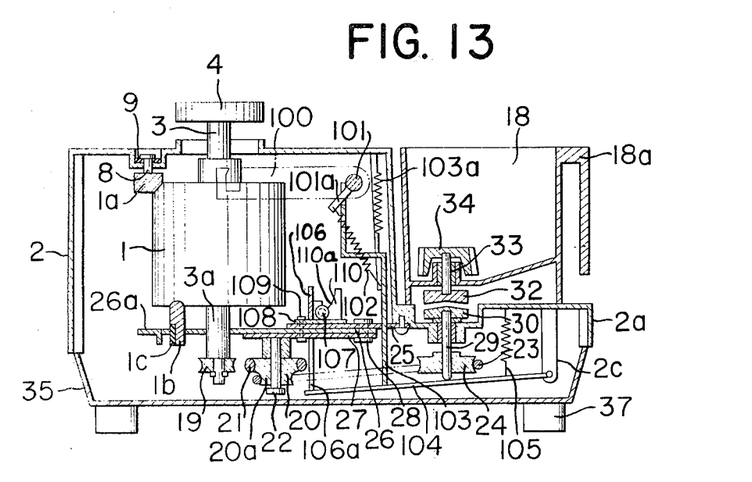
FIG. 13 is a view used for the explanation of the mode of operation of a lock lever and clutch means of the second embodiment.
Figure 14:
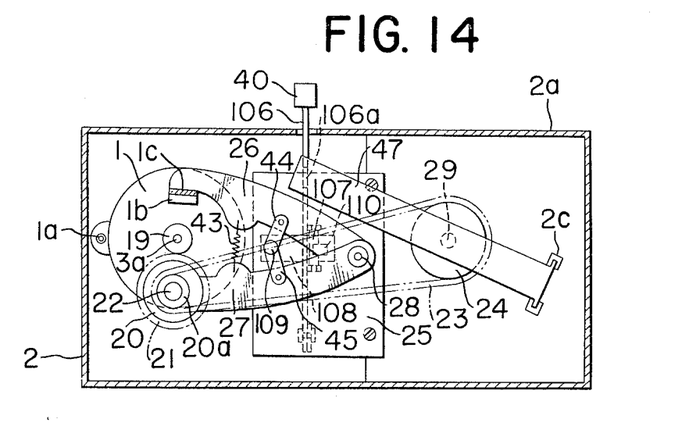
FIGS. 14 and 15 are views used for the explanation of the mode of operation of rotation transmission means and motor supporting means of the second embodiment, respectively.
Figure 15:
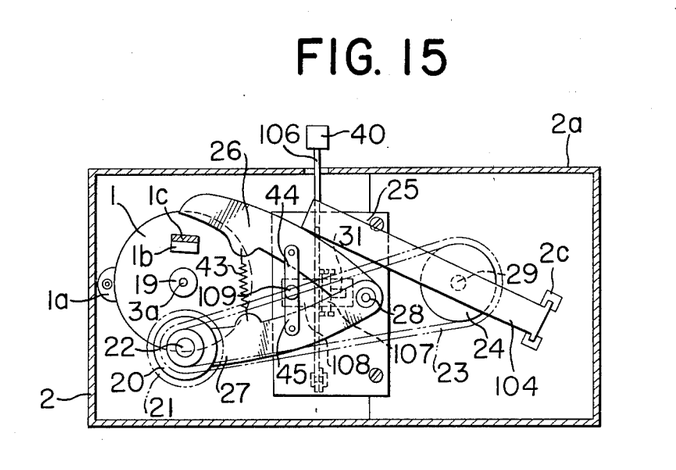
Figure 16:
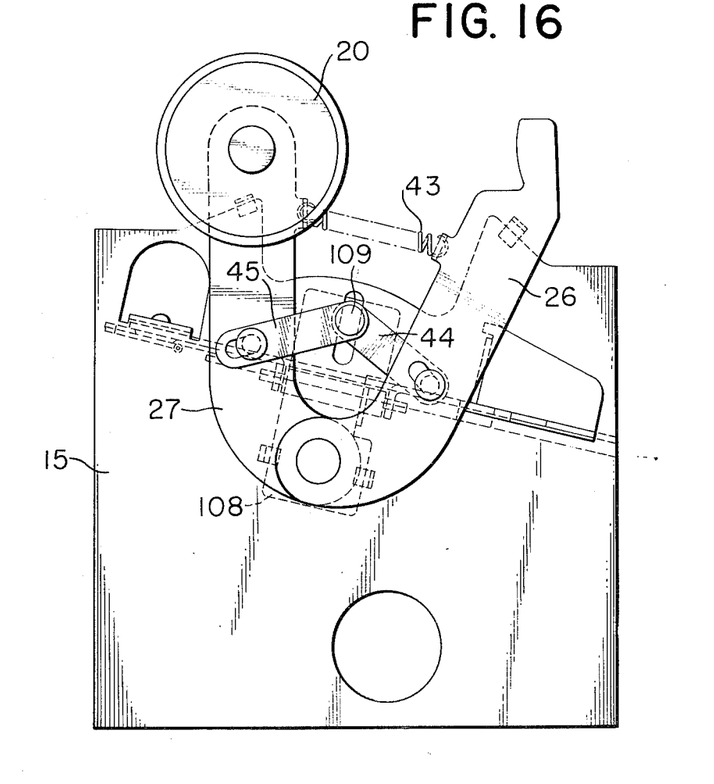
FIGS. 16 and 17 are views, on enlarged scale, used for the explanation of rotation transmission means and motor supporting means of the second embodiment, respectively.

Secondly, the pivot pin 28 is located on the line interconnecting the centers of the pulleys 20 and 24 or at a point deviating from this interconnecting line remote from the driving pulley 19 the line of action of the force, which is caused by the contracting force of the endless belt 23, to tend to move the intermediate pulley 20 toward the driven pulley 24, passes the pivot 28 or a point above the pivot 28 as shown in FIGS. 7 and 8. As a result, the component in the direction of the driving pulley 19 of the force acting upon the center of the intermediate pulley 20 becomes zero or positive so that there no force be produced which tends to cause the intermediate pulley 20 to move away from the driving pulley 19. On the other hand, when the pivot pin 28 is located above the interconnecting line toward the driving pulley 19 as shown in FIG. 9, the endless belt 23 exerts a force on the intermediate pulley 20 to move it away from the pulley 19 so that the biasing force of the spring 43 is decreased. Reference numeral 37 denotes a rubber leg; 38, a locking member for holding the container 10 and the cover 15 in position upon the casing 2; and 2b, a glass stand recessed in the juice receiver stand 2a of the casing 2 for receiving a glass 36 in alignment with the juice discharge port 13.

In the normal operation, an ingredient such as a fruit is charged into the charging port or tube 16 and pressed against the cutter 7 by the push rod 17, so that when the motor 1 is driven, the charged ingredient is separated into juice and solid wastes. When it is desired to mix the juice received in the juice receiver or the juice to be discharged into the juice receiver 18, the switch 39 is closed to drive the motor 1 and the knob 40 is moved in the direction indicated by the arrow in FIG. 4, that is, in the counterclockwise direction so as to cause the pivot of the movable members 44 and 45 to move toward the left. When the movable members 44 and 45 are moved further after they have been once aligned with respect to each other, the movable arms 26 and 27 are caused to move toward each other under the force of the spring 43 so that the rubber ring 21 wrapped around the intermediate pulley 20 is pressed against the driving pulley 19 and the free end of the movable arm 26 abuts against the yielding rubber 1c of the support 1b of the motor 1. As a result, the rotation of the lower rotary shaft 3a of the motor 1 is transmitted to the friction coupling member 30 through the intermediate pulley 20, the pulley 20a, the endless belt 23 and the driven pulley 24 and to the friction coupling member 32 rotatably fixed to the juice receiver 18 and hence to the mixing blade 34. The frictional forces may be produced between the friction coupling members 30 and 32 due to the weight of the juice receiver 18 including the juice therein and the force of the spring 31. Since the friction coupling of the type described is used, the juice receiver 18 may be moved out of the juicer by gripping the handle 18a. Since the lower friction coupling member 30 has a cone-shaped friction engagement surface and the upper friction coupling member 32 has a mating friction engagement surface, the upper and lower friction coupling members 32 and 30 may be automatically aligned during the rotation even when the juice receiver 18 is deviated a little from a normal position.

To stop mixing, the knob 40 is moved in the clockwise direction against the spring 43 so as to align the movable members 44 and 45 with respect to each other. When their pivot point is moved toward the right after they have been aligned, the knob 40 tends to rotate in a clockwise direction under the force of the spring 43 even when no force is applied to the knob 40, but this rotation is limited by the stopper 25a. That is, the knob 40 is stopped at a predetermined position. In this case, the movable arms 26 and 27 a re moved away from each other by the maximum distance and the transmission of power to the friction coupling member 30 is interrupted. The vibrations in the horizontal direction due to the rotation of the motor 1 are possible, and the reduction in vibration and noise when the juice is extracted is not adversely affected.

In the first embodiment, only one motor is provided, but it will be understood that an additional motor may be provided for mixing the juice in the juice receiver 18.

Second Embodiment, FIGS. 10–17

Next, the second embodiment of the present invention will be described hereinafter with reference to FIGS. 10–17.

The second embodiment is different from the first embodiment in that the knob 40 for driving the mixing device in the juice receiver is operated vertically, and that means is provided for preventing the driving of the mixing device as long as the lock for holding the container and the cover upon the casing is opened, thereby ensuring the safety of the juicer.

The same reference numerals are used to designate similar component parts throughout the figures, and the component parts which have been already described in the first embodiment will not be made in the second embodiment.

Figure 17:
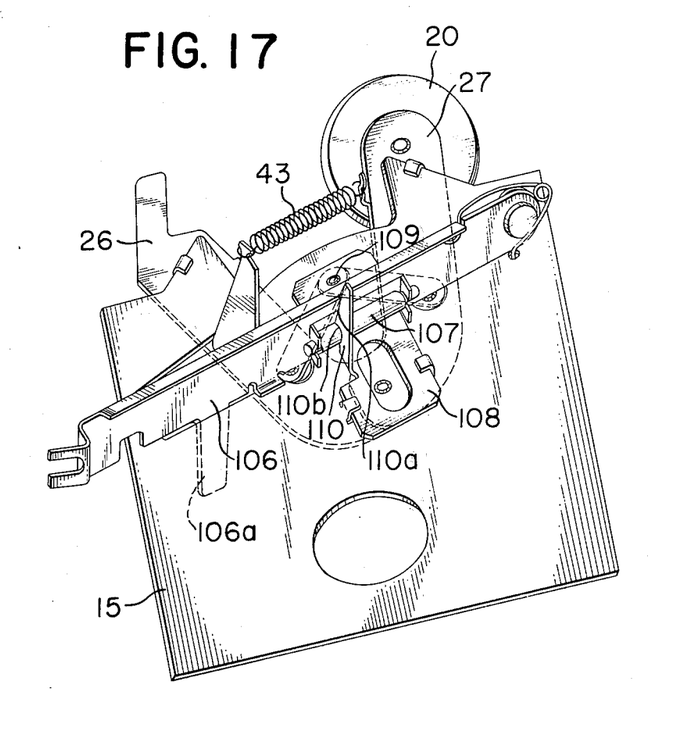

A lock lever 100 has its one end pivoted to the casing 2 and the other end 100a in the form of a hook for engagement with a projection 15a extended from the cover 15, whereby the cover 15 and the container 10 may be securely held upon the casing 2. A shaft 101 which is rotatably supported by the casing 2 is securely fixed to the lock lever 100 at its lower end, and a spring 102 is loaded so that the lock lever 100 may be normally biased to move away from the projection 15a. Therefore, the engagement of the lock lever 100 with the projection 15a must overcome the force of the spring 102, and once they are engaged with each other they are prevented from disengaging from each other under the force of the spring 102. A sliding member 103 which is disposed within the casing 2 for vertical sliding movement is normally biased to move upwardly under the force of a spring 103a, and is adapted to vertically move in response to the movement of a guide rod 101a fixed to the shaft 101. A lever 104 whose one end is pivoted to the lower end of a bracket 2c fixed to the casing 2 is biased by a spring 105 to be normally moved upwardly to make contact with the lower end of the shaft 29 of the friction coupling disk 30. In the second embodiment, the shaft 29 is vertically movably supported by the casing 2 so that the shaft 29 is moved upwardly by the lever 104 to engage the lower friction coupling disk 30 with the upper friction coupling disc 32 for power transmission. When the lock lever 100 is rotated to the position indicated by the two-dot chain lines shown in FIG. 13, the sliding member 103 is lowered so that its lower end engages with the lever 104 to cause it to move downwardly. As a result, the shaft 29 is also lowered so that the lower friction coupling disk 30 is disengaged from the upper friction coupling disc 32. One end of an operating lever 106 is pivoted to the mount 25 and the other end thereof is fixed to the knob 40. Unlike the knob 40 of the first embodiment which is moved in the horizontal direction, the knob of the second embodiment is moved in the vertical direction. A rod or roller 107 is rotatably supported by the operating lever 106 in parallel therewith and substantially at the midpoint thereof. A slider 108 which is slidably disposed upon the mount 25 is fixed to the pivot 109 of the movable members 44 and 45 for slidable movement in unison with the pivot 109. An upright guide member 110 is formed integral with the slider 108 and is adapted to guide and engage with the rotary rod 107 on the operating lever 107. The upright guide member 110 has an inclined guide portion 110a which engages the rotary rod 107 so as to transform the rotation of the rotary rod 107 into the sliding motion of the slider 108, and an engaging portion 110b for engagement with the rotary rod 107 as seen in FIG. 17. When the knob 40 fixed to the other end of the operating lever 106 is pushed downwardly as shown in FIG. 17, the rotary rod 107 is pressed against the inclined guide portion 110a of the upright guide member 110 so that the slider 108 is caused to move and the movable arms 26 and 27 are moved away from each other against the force of the coiled spring 43. As a result, the intermediately pulley 20 is moved away from the driving pulley 19 fixed to the lower driving shaft 3a of the motor 1 so that the rotation of the motor 1 is not transmitted to the lower friction coupling disc 30. When the operating lever 106 is moved downwardly, a projection 106a formed integral with the operating lever 106 engages with the lever 104 to cause it to move downwardly so that the shaft 29 is lowered and the lower friction coupling disk 30 is moved away from the upper friction coupling disk 32. Thus, when the operating lever 106 is pushed downwardly the friction coupling disc 32 is disconnected from the motor 1, and is physically disengaged from the friction coupling disc 30. When the rotary rod 107 engages the engaging portion 110b, the movement of the rod 107, and hence the movement of the operating lever 106, is stopped.

The features of the second embodiment are, as described hereinbefore, that no rotational force is transmitted to the upper friction coupling disk 32 unless the container 10 and the cover 15 are securely held in normal position upon the casing 2 by means of the lock lever 100 and that mixing will not be started at all unless the juice receiver 18 is placed in a normal position between the casing 2 and the container 10. A further feature of the second embodiment resides in the fact that the lower friction coupling member 30 is retracted in a recess formed in the stand 2b of the casing when the mixing device is not driven so that an operator is protected from injuries to fingers caused by the contact with the lower friction coupling member 30.

In the second embodiment, instead of the friction coupling, toothed coupling means such as gears may be used, but care should be taken so that the stroke of the shaft 29 must be in excess of the width of the gears in order to permit the disengagement thereof.

What is claimed is:
1. A juicer comprising
   a. a casing containing a motor,
   b. a centrifugal separating basket for separating juice from solid waste, said basket being coupled to said motor to be driven thereby,
   c. a juicer container mounted upon said casing for receiving temporarily therein extracted juice and having a juicer discharge port, said basket being positioned within the juice container,
   d. juice receiving means releasably mounted on said casing and positioned to receive juice dispensed from said port,
   e. juice mixing means disposed within said juice receiving means,
   f. rotation transmitting means coupled to said motor, clutch means having first and second disks and being interposed between said juice mixing means and said transmitting means for transmitting the torque of said motor to said juice mixing means by way of said transmitting means,
   g. said transmitting means comprising means for selectively transmitting the rotation of said motor to said disc of said clutch means; and
   h. means for externally operating said means for selectively transmitting the rotation of said motor to said second disk.

2. A juicer as defined in claim 1, wherein said first and second disks of said clutch means are made of a material having a high coefficient of friction, whereby the rotation is transmitted from said second disk to said first disk by friction, said second disk of said clutch means being vertically movably supported by said casing in such a manner that when said engagement of said rotation transmitting means with said rotary shaft of said motor is released, said second disk of said clutch means is lowered away from said first disk of said clutch means.

3. A juicer as defined in claim 1 comprising shock absorbing means for suspending said motor from said casing, means for selectively pressing said transmitting means against a rotary member on said motor, support means movably mounted to support said motor so as to counteract the force exerted to the rotary member of said motor when said rotation transmitting means is pressed against said rotary shaft, and means for actuating said support means in synchronism with said rotation transmitting means.

4. A juicer as defined in claim 3 wherein said rotation transmitting means comprises
   a. a driving pulley fixed to the rotary shaft of said motor, and
   b. a first movable arm having one end pivoted with a pivot pin to said casing and an intermediate pulley on the other end of said first arm adapted to be selectively pressed against said driving pulley for rotation transmitting;
said support means comprises
   a. a support fixed to said motor, and
   b. a second movable arm having one end pivoted to said casing together with said one end of said first movable arm with said pivot pin, the other end of said second arm being adapted to selectively engage said support when said intermediate pulley carried by said first movable arm is moved into engagement with said driving pulley, thereby preventing displacement of said motor; and
said juicer further comprises operating means comprising
   a. first and second movable arms having first ends pivoted to the midpoints of said first and second movable arms, respectively, and second ends pivoted to each other with a pivot pin, and
   b. an operating lever having one end pivoted to said last mentioned pivot pin, the other end thereof extended out of said casing and the midpoint thereof being pivoted to the casing.

5. A juicer as defined in claim 1 wherein said rotation transmitting means comprises
   a. a driving pulley fixed to the rotary shaft of said motor,
   b. a movable arm having one end pivoted to said casing and an intermediate pulley on the other end of said arm whereby said intermediate pulley is adapted to be selectively pressed against said driving pulley as said movable arm swings,
   c. a driven pulley fixed to the rotary shaft of said second disk of said clutch means,
   d. an endless belt wrapped around said intermediate and driven pulleys, and
   e. means for biasing said movable arm so as to cause said intermediate pulley to be pressed against said driving pulley; and
said operating means comprises
   a. an operating lever for selectively causing the engagement or disengagement of said intermediate pulley with or from said driving pulley,
   b. means for operatively coupling said operating lever to said movable arm, and
   c. means for locking the engagement of said intermediate pulley with said driving pulley.

6. A juicer as defined in claim 5 wherein when said intermediate pulley is pressed against said driving pulley, the center of the pivot on which said movable arm is pivoted to said casing being located substantially on a line interconnecting the centers of said intermediate and driven pulleys.

7. A juicer as defined in claim 6 wherein said pivot is located between said driving and driven pulleys.

8. A juicer as defined in claim 5 wherein said intermediate pulley is pressed against said driving pulley, the center of the pivot on which said movable arm is pivoted to said casing being located at a position slightly displaced from the line interconnecting the centers of said intermediate and driven pulleys in the direction remote from said driving pulley.

9. A juicer comprising
   a. a casing containing a motor,
   b. a centrifugal separating basket for separating juice from solid waste,
   c. a juicer container mounted upon said casing for receiving temporarily therein extracted juice and having a juicer discharge port, said basket being positioned within said juice container,
   d. juice receiving means releasably mounted on said casing and positioned to receive juice discharged from said port,
   e. juice mixing means disposed within said juice receiving means,
   f. rotation transmitting means coupled to said motor,
   g. clutch means having first and second disks and being interposed between said juice mixing means and said transmitting means for transmitting the torque of said motor to said juice mixing means by way of said transmitting means, and
   h. said basket being drivingly engaged with said motor independently of said mixing means.

10. A juicer as defined in claim 9 wherein
    a. said container is releasably mounted upon said casing and has a space for receiving extracted juice, a space for receiving solid waste, and a juice discharge port connected to said space for receiving juice,
    b. said juicer further having a space defined between said juice discharge port of said container and said casing for receiving therein said juice receiving means, and
    c. wherein said second disc of said clutch means is vertically movably disposed and biased in an upward direction.

11. A juicer as defined in claim 9 wherein said first and second disks of said clutch means are made of material having a high coefficient of friction, whereby the rotation is transmitted from said second disk to said first disk by friction.

12. A juicer as defined in claim 11 further comprising lock means positioned to hold said container upon said casing, and means for holding said second disk of said clutch means in engagement with said first disk when said lock means holds said container upon said casing whereby when said lock means is released, said second disk of said clutch means is lowered to be released from said first disk.

13. A juicer as defined in claim 11 wherein said second disk of said clutch means has a cone-shaped friction engagement surface extended outwardly whereas said first disk has a cone-shaped recessed friction engagement surface adapted to mate with said cone-shaped extended surface of said second disk.

* * * * *